United States Patent [19]

Jadhav et al.

[11] Patent Number: 5,391,686
[45] Date of Patent: Feb. 21, 1995

[54] POLYURETHANE COMPOSITIONS HAVING ENHANCED CORROSION INHIBITING PROPERTIES

[75] Inventors: Jalandar Y. Jadhav, Ellicott City; Cung Vu, Columbia, both of Md.

[73] Assignee: W. R. Grace & Co.-Conn., New York, N.Y.

[21] Appl. No.: 991,903

[22] Filed: Dec. 17, 1992

[51] Int. Cl.$^6$ .............. C08G 18/48; C08G 18/76; B32B 15/08; B32B 27/40

[52] U.S. Cl. .................................... 528/77; 528/76; 524/425; 524/450; 524/788; 524/789; 524/791; 525/131; 525/460; 427/385.5; 427/388.1; 427/388.2; 428/423.1; 428/425.8

[58] Field of Search ............. 528/77, 76; 524/450, 524/789, 791, 425, 788; 525/131, 460; 427/385.5, 388.1, 388.2; 428/423.1, 425.8

[56] References Cited

U.S. PATENT DOCUMENTS

| | | | |
|---|---|---|---|
| 3,422,054 | 1/1969 | Kelly | 528/77 |
| 4,518,718 | 5/1985 | Frost | 521/122 |
| 4,826,885 | 5/1989 | Tsai | 528/77 |

*Primary Examiner*—John Kight, III
*Assistant Examiner*—Rabon Sergent
*Attorney, Agent, or Firm*—James P. Barr; Alfred Glueksmann

[57] ABSTRACT

A novel polyurethane formulation especially effective as a corrosion preventing coating for metallic substrates. The polyurethane is prepared by mixing two components, one being a mixture of high and low molecular weight polyol compounds and the other being a polymeric methylene polyphenyl isocyanate (MDI).

7 Claims, No Drawings

POLYURETHANE COMPOSITIONS HAVING ENHANCED CORROSION INHIBITING PROPERTIES

FIELD OF THE INVENTION

The present invention relates to certain novel polyurethane compositions and to their use as corrosion inhibiting coatings to protect metallic substrates.

BACKGROUND OF THE INVENTION

Coal tar enamels, asphalt, and epoxy coal tar paints have previously been used as anti-corrosive coating compositions. These coating compositions have a number of drawbacks, inter alia, they are poor in low temperature characterics such as curability, brittleness, impact resistance and flexibility. The example, epoxy coal tar paints, while having good adhesion properties, have poor coating efficiency and abrasion resistance because cure time is extensive thereby hindering the application of relatively thick coatings.

Melt coating of polyethylene has also been used to provide ferrous substrates with corrosion inhibiting coatings, however, these require large-scale equipment for application, are not practical for the application of small amounts, or onto difficultly accessible areas such as in weld zones or irregularly shaped portions of steel pipes.

Polyurethane coatings for metallic substrates are known, particularly in the automotive industry field. See, for example, U.K. Patent Application No. 2,147,910 or U.S. Pat. Nos. 4,554,188, 4,400,497 or 4,525,570. Two-component mixes for the preparation of polyurethane resins are well known. The first polyurethane resins were made by reacting together a polyol and a diisocyanate. As a result, various two-component mixes are described, for example, in U.S. Pat. Nos. 4,410,597 and 4,101,473.

The prior art is documented by patented literature describing two-component polyurethane systems comprised of a single polyol compound component and of a polyisocyanate compound component.

The prior art is also documented by references characterized by teachings of the use of a combination of polyol compounds of differing functionality, i.e. of hereinafter referred to compounded polyols, in conjunction with a given polyisocyanate compound.

U.S. Pat. No. 5,290,632 discloses a two-component polyurethane composition comprising (A) a mixture of castor oil, a polyol compound, and an elastomeric diol compound and (B) a polyisocyanate compound.

Additional references teaching the use of compounded polyols in conjunction with polyisocyanates in the preparation of polyurethane coatings include the following:

U.S. Pat. No. 4,100,010, reissued as U.S. Re. Pat. No. 33,175 which teaches the use of a mixture of polypropylene diol and polypropylene triol in conjunction with an aliphatic diisocyanate compound.

U.S. Pat. No. 3,539,424 which describes a polyurethane resin film made from two components, where the polyol component may be a mixture of polypropylene ether triol and polypropylene ether diol and where the isocyanate component is toluene diisocyanate.

Additionally, U.S. Pat. No. 4,853,054 teaches the use of a diphenylmethane diisocyanate (MDI) prepolymer in conjunction with a mixture of polyols as part of a polyurethane forming composition and therein said mixture of polyols is a trifunctional ethylene oxide capped polypropylene oxide with a difunctional ethylene oxide-capped polypropylene oxide.

Additional references teaching polyurethane systems comprising MDI/polyol combination components are found in U.S. Pat. Nos. 5,021,535, 4,855,185, 4,710,560, 4,365,025.

None of the above cited references disclose formulations which provide polyurethane products which exhibit superior corrosion properties fast cure ratio, good adhesion, adequate flexibility, low moisture transmission and no delamination when applied to a substrate.

The need has arisen therefore, for the provision of polyurethane compositions which will be characterized by the absence of the commonly found disadvantages of the prior art conventional anti-corrosion coating compositions.

SUMMARY OF THE INVENTION

It is an object of this invention to provide for novel polyurethane compositions.

It is another object of this invention to provide for corrosion preventing polyurethane compositions which are characterized by fast cure rates, excellent adhesion to metallic substrates, adequate flexibility, low moisture vapor transmission, minimum cathodic disbonding and excellent impact resistance.

In accordance with the present invention there has been provided a novel polyurethane composition which is particularly useful as a corrosion inhibiting coating for metallic substrates which comprises a reaction product of two components referred to hereinafter as Components (A) and (B) wherein Component (A) comprises a mixture of a high molecular weight polypropylene diol or triol (or mixture thereof) and of a low molecular weight polypropylene triol, and Component (B) comprises a polymeric polydiphenylmethane isocyanate. As used hereinafter the term "high molecular weight polypropylene diol or triol" refers to those polypropylene diol or triol compounds having an average hydroxyl equivalent weight in the range of from 500 to 2000, and the term "low molecular weight polypropylene triol" refers to those polypropylene triols having an average hydroxyl equivalent weight in the range of from 100 to 200.

Also provided in accordance with the present invention is a method for inhibiting corrosion of metal substrates comprising coating the substrates with the novel two-component polyurethane resins of this invention. The polyurethane compositions of this invention, when applied as a coating to metallic substrates provide excellent corrosion inhibition, cure fast at ambient temperatures, show excellent adhesion and flexibilty, exhibit very good impact resistance, show low moisture vapor transmission and also show minimum cathodic disbonding, i.e. delamination due to corrosion.

DETAILED DESCRIPTION OF THE INVENTION

The present invention is directed to novel polyurethane resin formulations which are useful for coating various substrates, and more specifically, the present invention provides for novel polyurethane resin formulations which when applied as coatings to metallic substrates impart thereto a high degree of corrosion prevention.

The polyurethane resins of the present invention comprise the reaction product of two components wherein Component (A) comprises a mixture of polyols hereinafter referred to as a compounded polyol and Component (B) comprises a polyisocyanate compound.

The compounded polyol Component (A) of the present invention comprises a mixture of a high and a low molecular weight polypropylene oxide adduct of a polyol.

The high molecular weight polyol corresponds to a diol or triol or mixture thereof, and has an average hydroxyl equivalent weight of 500 to 2000, preferably 500 to 1500.

The high molecular weight diol is a polypropylene oxide adduct of a diol and is represented by the following structure:

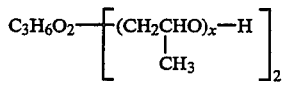

wherein x is from 5 to 20, preferably from 7 to 10.

The high molecular weight triol is propylene oxide adduct of a triol and is represented by the following structure:

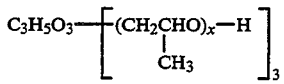

wherein x is from 5 to 20, preferably from 7 to 10.

The high molecular weight polyol may optionally be a mixture of the above diols and triols in a weight ratio of 1:99 to 99:1.

The low molecular weight triol is a polypropylene oxide adduct of a trimethylolpropane based triol represented by the structure:

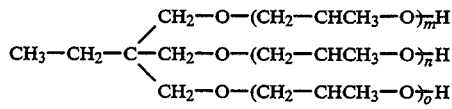

where m, n, o are 1–3 and which has an average hydroxyl equivalent weight of 100 to 200, preferably 150.

The high molecular weight polypropylene diol and/or triol is blended with the low molecular weight polypropylene triol to provide a compounded polyol having an average hydroxyl equivalent weight of 200 to 400.

Component (B) is a polymeric polydiphenylmethane isocyanate (hereinafter referred to as polymeric MDI) having an average molecular weight of 290 to 400 and an average functionality of 2.2 to 3.0. Polymeric MDI may be prepared by the phosgenation of aromatic polyamines. The aromatic polyamines are made by the condensation of aniline and formaldehyde. The typical reactions involved in the manufacture of polymeric MDI are summarized below:

PREPARATION OF POLYMERIC MDI

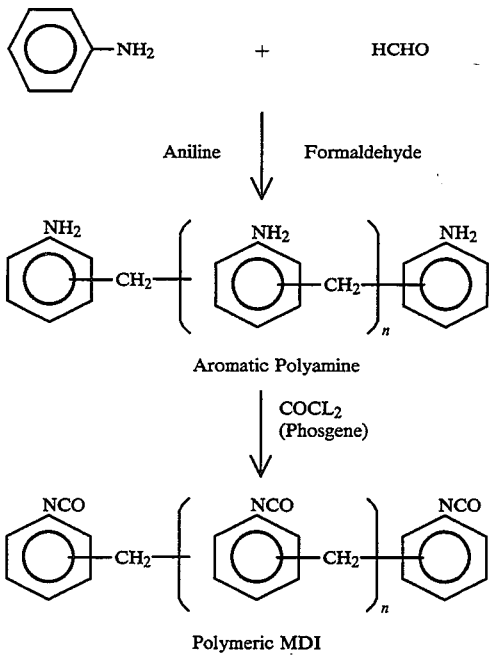

Depending on the ratio of aniline to formaldehyde and the reaction conditions, trimers (n=1), tetramers (n=2), and some higher oligomers can be obtained. Besides 4,4'-diphenyl, 2,4'-diphenyl and 2,2'-diphenyl isomers are also obtained. The main constituents of the crude polymeric MID blend are 40-60% 4,4'-MDI, 2-3% 2,4'-MDI and less than 2% 2,2'-MDI; the remainder is trimeric species, and higher molecular weight oligomers. The average functionality of undistilled crude MDI is 2.6. Vacuum distillation separates the pure 4,4'-MDI (40–50%) as a low melting solid and remaining will be mainly high functionality polymeric MDI. Suitable polymeric MDI for use in this invention are commercially available from Dow Chemical Corp. under the trademark PAPI 2027. The following table describes five grades suitable of polymeric MDI supplied by Dow Chemicals.

| Polymeric MDI | Polymeric MDI Products from Dow | | | | | |
|---|---|---|---|---|---|---|
| | Functionality | Isocyanate EW | Wt. % NCO | Visco., cps[a] | Acidity (% HCL) | Density (g/ml) |
| PAPI* 2020 | 3.0 | 140.0 | 30.0 | 2000 | 0.04 | 1.25 |
| PAPI 2027 | 2.7 | 134.0 | 31.4 | 180 | 0.03 | 1.23 |
| PAPI 2094 | 2.3 | 131.0 | 32.0 | 50 | 0.03 | 1.22 |
| PAPI 2580 | 2.8 | 136.5 | 30.8 | 725 | 0.04 | 1.24 |
| PAPI 2901 | 2.3 | 133.0 | 31.6 | 55 | 0.02 | 1.22 |

*Trademark of The Dow Chemical Company, [a]At 25° C.

The polyurethane compositions of the present invention are readily prepared by intimately mixing together component (A) and component (B) to form the polyurethane reaction product. The ratio of component (A) to component (B) is not critical, per se, to the invention and are generally combined on a stoichiometric basis depending on the functionality of the compounded polyol component (A). These ratios are generally in the range of 100:30-50 of component (A):component (B) respectively, on a weight basis.

The polyurethane compositions of the present invention may be useful for coating a variety of substrates, and the choice of a particular substrate is not considered critical, per se, to the invention and generally includes any substrate where coating materials are routinely applied to inhibit or prevent damage due to transportation, installation, weathering and associated damage sources. These substrates include, but not limited to metallic substrates, cementitious structures, natural wood substrates or wood by-product substrates and other similar substrates.

While the invention's composition finds particular applicability as a corrosion inhibiting coating for metallic substrates such as, e.g., ferrous pipes, it may also be advantageously applied to other metal-containing substrates such as semi-porous cementitious substrates which encase metallic elements such as metal reinforcement rods.

The polyurethane compositions of this invention may be applied to substrates to form a coating thereon by a variety of techniques including, but not limited to, spraying, brushing, dipping, liquid extrusion coating or liquid ribbon coating. A preferred application technique involves the use of an air-less spray gun. These and other application techniques are well known to those skilled in the art. In the case of small batches, Components (A) and (B) can be mixed in an open container at room temperature, and the mixture can be spread onto the substrates. For general large scale work a conventional two-liquid air-less spray gun is recommended for best results. Application of the polyurethane formulations to substrates is preferably conducted at temperatures above freezing, and most preferably at temperatures around 25° C.

The ratios of Components (A) to (B) which have been determined to provide enhanced corrosion protection for ferrous and ferrous-like substrates are generally in the range of 2-2.6:1 on a volume basis.

The present invention's compositions may optionally include additives such as a water scavengers, a thixotropic agents, catalysts, antioxidants, reinforcing agents, plasticizers, UV stabilizers, pigments, elastomers, and fillers. These additives may be introduced in amounts ranging from 0.01 to 25% by weight of the total composition.

If the polyurethane composition is to be sprayed or otherwise applied in such manner that the two components are admixed at the point of application, a catalyst is desirable in order to insure quick curing. That is, it is preferred that the polyurethane coating should be dry to touch within minutes. For this purpose, substantially any of the conventional polyurethane catalysts, or combinations thereof, can be used.

Suitable polyurethane catalysts include but are not limited to tertiary amines such as trialkylene amines, e.g. triethylene diamine, N-alkyl morpholines, etc.; tin compounds such as stannous chloride, dibutyl tin dilaurate, stannous octoate, dibutyl tin maleate, etc.; and other metal organics such as zinc octoate, lead naphthanate, phenyl mercuric propionate, and the like or mixtures thereof.

The preferred amount of tertiary amine, tin or other metal-containing polyurethane catalyst is about 0.001-0.5%, based on the total weight of polyols plus polyisocyanate. Mixtures of tertiary amines and organometallics are particularly suitable as polyurethane catalysts for this invention.

On the other hand, if the polyurethane composition is to be applied over a period of time (say, 30 minutes or more), and where the components are pre-mixed, then the use of a catalyst is inadvisable. In fact, in these cases, the addition of an inhibitor may actually be useful to extend the storage life of the polyurethane composition. Suitable inhibitors include: organic and inorganic acids, such as benzoyl chloride, g-toluene sulfonic acid, formic acid, acetic acid, and the like.

When an inhibitor is used, it is generally added in a dosage amount in the range of about 0.01-1.0 weight % of the overall polyurethane formulation.

In humid conditions, i.e. at greater than 10% relative humidity or where there is underlying surface moisture, moisture absorbing additives may be added to the formulation. That is, in humid conditions where the compositions of the invention are sprayed, the spray droplets tend to absorb atmospheric moisture, and this moisture reacts with the polyisocyanate component in the formulation to release carbon dioxide, which causes foaming in the coating with consequent severe deterioration of properties in the cured coating. Molecular sieves such as zeolites and silica inhibit this foaming by absorbing moisture before it can react with the polyisocyanate component. When moisture absorbers are used, a suspending (thixotropic) agent is preferably used to maintain the molecular sieves in suspension. These materials are well known to those skilled in the art and are available commercially.

Fillers in the above formulations (e.g., molecular sieves such as zeolites or zeolite containing castor oil, and fumed silica) assist in viscosity control of the liquid polyurethane, aid in levelling the coating, and act preferably, as moisture absorbers. (See, e.g., U.S. Pat. No. 4,567,230 re molecular sieve moisture absorbers which is herein incorporated by reference). The moisture comes not from the resin, but rather from the underlying surface and from the atmosphere. The demoisturizing fillers can, however, be omitted, with acceptable results.

The product of the invention results in coatings having the following properties:

Fast curing at ambient temperatures (less than 5 minutes)

Excellent adhesion to metallic substrates (pull-off strength 10.87 N/mm$^2$)

Adequate flexibility (minimum 20% elongation)

Very good impact resistance (15 joules by ASTM G14)

Low moisture vapor transmission (<0.9 g/m$^2$/day)

Minimum cathodic disbonding (28 days less than 6 mm)

While is is envisaged that a wide variety of polyol compounds may be employed in formulating component A of the present invention the formulations which follow exemplify the specific ones which on the basis of analysis of experimental data gave the optimum results in the reduction to practice of the invention.

The following examples are provided to illustrate the invention in accordance with the principles thereof, but are not to be construed as limiting the invention in any way except as indicated in the appended claims. All parts and percentages in the following examples are be weight unless otherwise indicated.

EXAMPLE 1

The invention's Component "A" was prepared by admixing in a high shear mixer, followed by a degassing step, the following components:

Polypropylene glycol of hydroxyl equivalent weight of 500 (a diol which is commercially available under the trademark designation of PPG 1025) . . . 600 gms.
Propylene oxide adduct of trimethylolpropane of hydroxyl equivalent weight of 150 (a triol which is commercially available under the trademark designation of Baygal K55) . . . 420 gms.
Zeolite containing castor oil paste (a polyurethane catalyst which is commercially available under the trademark designation of Baylith L Paste and containing 50% by weight of zeolitic material) . . . 50 gms.
Calcium carbonate . . . 160 gms.
Fumed silica (obtainable under the trademark designation Aerosil R202) . . . 11 gms.
DABCO (triethylene diamine) catalyst (obtainable under the trademark designation 33-LV) . . . 1.3 gms.
DBTDL (dibutyl tin dilaurate) catalyst (obtainable under the trademark designation Metacure T-12) . . . 0.45 gms.

The polypropylene glycol and propylene oxide adduct of trimethylolpropane were blended to provide a compounded polyol Component (A) having an average hydroxyl equivalent weight of 303.

The above compounded polyol Component (A) was then mixed with a polymeric MDI. In this example, the polymeric MDI was a polymethylene polyphenyl isocyanate which is commercially available under the trademark designation of PAPI 2027.

The ratio by weight in grams of Component A to Component B was 100:46.

EXAMPLE 2

According to the same procedure in Example 1, the following were mixed:

Polypropylene glycol of hydroxyl equivalent weight 1000 (a diol obtainable in the trade under the trademark of Voranol 220-056) . . . 800 gms.
Propylene oxide adduct of trimethylol propane of hydroxyl equivalent weight of 150 (a triol obtainable in the trade under the trademark designation Baygal K55) . . . 420 gms.
Zeolite containing castor oil paste (Baylith L Paste) . . . 60 gms.
Calcium carbonate . . . 160 gms.
Silica (Aerosil R202) . . . 12 gms.
DABCO catalyst (33-LV) . . . 1.4 gms.
DBTDL catalyst (Metacure T-12) . . . 0.5 gms.

The polypropylene glycol and the propylene oxide adduct of trimethylol propane were blended to provide a compounded polyol Component (A) having an average hydroxyl equivalent weight of 394.

The same polyisocyanate Component (B) as in Example 1 was used, namely PAPI 2027 TM.

As in Example 1, Components (A) and (B) were mixed to form the final polyurethane product.

The ratio by weight in grams of Component (A) to Component (B) was 100:35.5.

EXAMPLE 3

According to the same procedure in Example 2, the following were mixed:

Polypropylene glycol of hydroxyl equivalent weight of 500 (a diol which is commercially available under the trademark designation of Voranol 220 110) . . . 500 gms.
Propylene oxide adduct of trimethylolpropane) of hydroxyl equivalent weight of 150 (a triol wghich is commercially available under the trademark designation of Baygal K55) . . . 450 gms.
Zeolite containing castor oil paste (Baylith L Paste) . . . 50 gms.
Calcium carbonate . . . 200 gms.
Silica (Aerosil R 202) . . . 12 gms.
DABCO (triethylene diamine) catalyst (33-LV) . . . 1.2 gms.
DBTDL (dibutyl tin dilaurate) catalyst (Metacure T-12) . . . 0.4 gms.

The polypropylene glycol and the propylene oxide adduct of trimethylolpropane were blended to provide a compounded polyol Component (A) having an average hydroxyl equivalent weight of 298.

The same polyisocyanate Component (B) as in Example 2 was used, namely PAPI 2027 TM.

As in Example 2, Components (A) and (B) were mixed to form the polyurethane product.

The ratio by weight in grams of Component (A) to component (B) was 100:47.

EXAMPLE 4

According to the same procedure as in preceding Example 3, the following were mixed:

Polypropylene triol of hydroxyl equivalent weight of 1000 (a triol which is commercially available under the trademark designation Voranol 230-056) . . . 400 gms.
Propylene oxide adduct of trimethylolpropane of hydroxyl equivalent weight of 250 (a triol which is commercially available under the trademark designation of Baygal K55) . . . 450 gms.
Zeolite containing castor oil paste (Baylith L Paste) . . . 60 gms.
Calcium carbonate . . . 160 gms.
Silica (Aerosil R 202) . . . 12 gms.
DABCO (triethylene diamine) catalyst (33-LV) . . . 1.5 gms.
DBTDL (dibutyl tin dilaurate) catalyst (Metacure T-12) . . . 0.5 gms.

The polypropylene triol and the propylene oxide adduct of trimethylolpropane were blended to provide a compounded polyol Component (A) having an average hydroxyl equivalent weight of 340.

The same polyisoyante Component (B) as in Example 3 was used, namely PAPI 2027 TM.

As in Example 3, Components (A) and (B) were mixed to form the final polyurethane product.

The ratio by weight in grams of Component (A) to Component (B) was 100:41.

EXAMPLE 5

The polyurethane formulations of the present invention were applied to metallic substrates and evaluated for anticorrosive properties, impact strength, penetration, adhesion, moisture vapor transmission, cathodic disbondment, hardness, flexibility, and tensile strength.

The cathodic disbondment tests were run according to the test method B. Gas PS/CW6 wherein a hole was drilled in the coating of a ductile iron coupon to simulate a defect in the coating. The coupon was then placed in salt water and current was introduced through the metal. After 7 days and 28 days, disbondment (delamination) of the coating around the hole was measured in millimeters.

Impact strength was evaluated using the procedure in ASTM G14 Impact Strength test specification wherein a falling weight is used to measure the coating resistance to chipping or breaking on impact with a solid object. The best available coatings on the market generally have an impact resistance of 15 Joules.

Sample panels using formulations of Examples 1–4 were prepared by hand casting a film of 1.8 to 1.0 mm thickness onto grit blasted 70 to 100 micron ductile iron panels. The coated substrate was rapidly tack free and cured at ambient temperature. The properties listed in the table below were obtained on ferrous pipe samples.

TABLE 1

Properties of Invention Composition Coatings on Ferrous Pipe Samples

| Test No. | Property | Test Method & Unit | Requirement | Coating Properties |
|---|---|---|---|---|
| 1 | Impact Strength | ASTM G14 | | |
| | - 90° | (Joules) | >15 | >15 |
| | - 45° | (Joules) | >15 | >15 |
| 2 | Cathodic Disbondment | B. Gas PS/CW6 | | |
| | - 7 day | (Mm) | <6 | 2–3 |
| | - 28 day | (Mm) | <6 | 3–4 |
| 3 | Penetration | ASTM G17 | | |
| | | (%) | <40 | <20 |
| 4 | Butt Adhesion | — | | |
| | | (psi) | — | 340 |
| 5 | Moisture Vapor Transmission Rate (MVTR) | ASTM E96 (g/m²/day) | <1 | <0.9 |
| 6 | Tensile strength | ASTM D638 | | |
| | | (N/mm²) | >15 | 15–20 |
| 7 | Elongation at Break | " (%) | 200 | 40 |
| 8 | Hardness | Shore A | 90 | 99+ |
| 9 | Flexibility | — | — | minimum 20% elongation |

As the averaged out test result values for formulations of Examples 1–4 in the table above demonstrate, the coating formulations of the present invention when applied to metallic substrates exhibited exceptional anticorrosive properties, provided excellent impact strength, penetration, adhesion, moisture vapor transmission and tensile strength.

While the illustrative embodiments of the invention have been described herein before with particularity, it will be understood that various other modifications will be apparent to and can be readily made by those of ordinary skill in the art without departing from the scope and spirit of the invention. Accordingly, it is not intended that the scope of the claims appended hereto be limited to the examples and descriptions set forth herein but rather that the claims be construed as encompassing all the features of patentable novelty which reside in the present invention including all features which would be treated as equivalents thereof by those skilled in the art to which the invention pertains.

The embodiments of this invention in which an exclusive property or privilege is claimed are defined as follows:

What is claimed is:

1. A corrosion inhibiting polyurethane coating composition applicable to metallic substrates, wherein said polyurethane coating comprises the reaction product of two Components, (A) and (B); Component (A) comprising, a compounded polyol having a hydroxyl equivalent weight in the range of 200 to 400 prepared by blending (i) a high molecular weight polypropylene oxide adduct of a polyol having an average hydroxyl equivalent weight in the range of from 500 to 2000 having the structure:

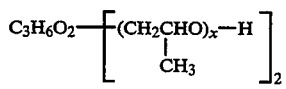

when said polyol is a diol compound and

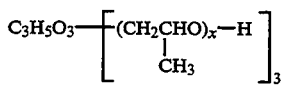

when said polyol is a triol compound wherein x is from 5 to 20, and (ii) a low molecular weight polypropylene oxide adduct of a trimethyolopropane based triol of average hydroxyl equivalent weight of 100 to 200 having the structure:

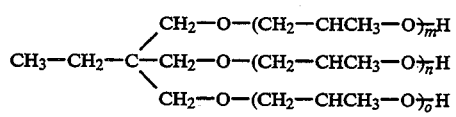

where m, n, o are independently 1–3 and; Component(B) comprising, a polymeric MDI having an average molecular weight of 290 to 400 and an average functionality of 2.2 to 3.0.

2. A process for inhibiting corrosion of metallic surfaces comprising applying to the metal surface the corrosion inhibiting polyurethane coating composition of claim 1.

3. The process according to claim 2 wherein the polyurethane composition is sprayed with an air-less spray gun.

4. An article comprising a substrate and a film coating adhered thereon wherein the film coating comprises the corrosion inhibiting polyurethane coating composition of claim 1.

5. An article comprising a substrate and a film coating adhered thereon wherein the film coating comprises the corrosion inhibiting polyurethane coating composition of claim 1 which further contains at least one additive selected from the group consisting of water scavengers, thixotropic agents, reinforcing agents, U.V. stabilizers, fillers, polyurethane catalysts, calcium carbonate, inhibitors, anti-oxidants, pigments, elastomers and plasticizers.

6. A process of aiding in the protection of a substrate surface from damage due to transportation, installation, weathering and associated damage sources comprising coating the surface of the substrate with a coating wherein the coating comprises the corrosion inhibiting polyurethane coating composition of claim 1.

7. A process of aiding in the protection of a substrate surface from damage due to transportation, installation, weathering and associated damage sources comprising coating the surface of the substrate with a coating wherein the coating comprises the corrosion inhibiting polyurethane coating composition of claim 1 which further contains at least one additive selected from the group consisiting of water scavengers, thixotropic agents, reinforcing agents, U.V. stabilizers, fillers, polyurethane catalysts, calcium carbonate, inhibitors, anti-oxidants, pigments, elastomers and plasticizers.

* * * * *